United States Patent [19]

Watanabe

[11] Patent Number: 5,041,984
[45] Date of Patent: Aug. 20, 1991

[54] METHOD OF CALCULATING AN AMOUNT OF OFFSET IN A WIRE CUT ELECTRIC DISCHARGE MACHINING OPERATION

[75] Inventor: Naoki Watanabe, Aichi, Japan
[73] Assignee: Mitsubishi Denki K.K., Tokyo, Japan
[21] Appl. No.: 401,398
[22] Filed: Aug. 31, 1989

[30] Foreign Application Priority Data

Sep. 1, 1988 [JP] Japan ................. 63-219201

[51] Int. Cl.$^5$ .............. G05B 13/04; G05B 19/18
[52] U.S. Cl. .............. 364/474.04; 364/474.18; 364/474.35; 318/572; 219/69.17
[58] Field of Search ............. 364/474.04, 474.18, 364/474.35; 219/69.17; 318/572

[56] References Cited

U.S. PATENT DOCUMENTS

| | | | |
|---|---|---|---|
| 4,078,163 | 3/1978 | Bell, Jr. et al. | 364/474.04 |
| 4,559,434 | 12/1985 | Kinashita | 219/69.17 |
| 4,559,601 | 12/1985 | Kishi et al. | 364/474.04 |
| 4,649,252 | 3/1987 | Obara | 219/69.17 |
| 4,703,146 | 10/1987 | Kinoshita | 364/474.04 |

Primary Examiner—Jerry Smith
Assistant Examiner—Patrick Muir
Attorney, Agent, or Firm—Sughrue, Mion, Zinn Macpeak & Seas

[57] ABSTRACT

A method of calculating an amount of offset for a wire electrode in a wire cut electric discharge machining operations. The offset amount for each of machining steps from coarse machining to finish machining are calculated with reference to a data table including a plurality of offset data each including a combination of a first machining margin to be removed by the wire electrode per se and a second machining margin to be removed by an electric discharge. The method is capable of reducing the number of data required for determination of the offset amounts for plural machining steps.

4 Claims, 5 Drawing Sheets

| MACHINING STEP | OFFSET AMOUNT |
|---|---|
| FIRST | $H_1$ |
| SECOND | $H_2$ |
| THIRD | $H_3$ |
| FOURTH | $H_4$ |

| MACHINING CONDITION | MACHINING MARGIN | DISCHARGE GAP WIDTH |
|---|---|---|
| A | $w_1$ | $g_1$ |
| B | $w_2$ | $g_2$ |
| C | $w_3$ | $g_3$ |

METHOD OF CALCULATING AN AMOUNT OF OFFSET IN A WIRE CUT ELECTRIC DISCHARGE MACHINING OPERATION

BACKGROUND OF THE INVENTION

The present invention relates to a method of calculating an amount of offset for a wire electrode in a wire cut electric discharge machining operation.

In the electric discharge machining operation, the amount of offset is determined according to machining conditions such as the material and diameter of the wire electrode, the material and thickness of a workpiece to be machined.

FIG. 1 is an explanatory diagram showing the entire arrangement of a conventional wire electric discharge machining apparatus.

In FIG. 1, reference numeral 50 designates a numerical control unit for controlling the wire cut electric discharge machine; 51, a machining power source unit for applying a high frequency pulse voltage across a wire electrode 52 and a workpiece 53 to be machined which is of electrically conductive material; 54 and 55, movable tables which are movable in the direction of X-axis and in the direction of Y-axis, respectively, with the workpiece fixedly positioned thereon; 56 and 57, drive motors for driving the movable tables 54 and 55 in response to instructions from the numerical control unit 50; 58 and 9, die feeders for supplying the output high frequency pulse voltage of the machining power source unit 51 to the wire electrode 52; 60, a wire winding bobbin; 61, a wire supply bobbin; and 65, a machining solution supplying device for supplying a machining solution (generally water) to the gap between the wire electrode 52 and the workpiece 53.

FIG. 2 is a schematic diagram illustrating a sectional view of the wire electrode 52 and the workpiece 53 in the case where a die is formed by machining the workpiece 53 four times (four machining steps). In FIG. 2, reference character $H_1$ designates the amount of an offset in the first machining steps, and 74, the locus of the center axis of the wire electrode 52. Similarly, in FIG. 2, reference characters $H_2$, $H_3$ and $H_4$ designate the amounts of offset in the second, third and fourth machining steps, respectively; and 75, 76 and 77, the loci of the center axis of the wire electrode 52 in the machining steps, respectively.

FIG. 3 is a table indicating the amounts of offset in the first, second, third and fourth machining steps.

The operation of the wire cut electric discharge machining apparatus thus organized will be described hereinafter.

In response to an instruction provided according to the machining pattern program stored in the numerical control unit 50, the movable tables 54 and 55 are moved in the direction of X-axis and in the direction of Y-axis so that the wire electrode 52 and the workpiece 53 are moved relative to each other so that the workpiece is machined with the discharge energy to obtain an aimed two-dimensional contour, while a discharge machining pulse voltage is applied across the wire electrode 52 and the workpiece 53. In this operation, the machining solution supplying device 65 applies the machining solution to the discharge gap between the wire electrode 52 and the workpiece 53, in order to electrically insulate the wire electrode 52 and the workpiece 53 from each other, to cool down the wire electrode 52 and the workpiece 53, and to remove sludge formed by electric discharge.

The aimed two-dimensional contour is obtained by electric discharge machining the workpiece as described above. In this case, the machining operation should be carried out along the locus which is shifted from the NC program locus by the sum of the wire radius and the discharge gap. This is the aforementioned amount of offset. The amount of offset depends on machining conditions and changes every machining operation. Therefore, every machining operation it is necessary to read the amount of offset (hereinafter referred to as "offset data", when applicable) from a machining condition table or the like. This will be described with reference to FIGS. 2 and 3.

As was described above, FIG. 2 shows a sectional view of the wire electrode 52 and the workpiece 53 in the case where a die is formed by machining the workpiece four times. In the first machining step, the amount of offset is set to $H_1$, so that the center axis of the wire electrode 52 goes along the locus 74 to provide a machined surface 78. Then, a finishing machining operation including second, third and fourth machining steps is effected. That is, in the second machining step, the amount of offset is set to $H_2$, so that the center axis of the wire electrode 52 moves along the locus 75, to form a machined surface 79. Similarly, in the third and fourth machining steps, the amount of offset is set to $H_3$ and $H_4$. Thus, finally, a finished surface 81 is obtained.

In the conventional method of setting the amount of offset, when the number of machining steps (four in the above description) changes, the amount of offset for each machining step is changed. That is, in the case where, in FIG. 2, a machining operation is carried out only once to complete the final aimed die under the same machining condition as the first machining step, the machined surface 78 can be regarded as the final finished surface 81. In this case, the distance between the surface 78 and the center axis of the wire electrode 52 is employed as the amount of offset, then the aimed pattern can be formed by machining the workpiece only once. However, it should be noted that, in this operation, the amount of offset is the sum of the radius of the wire electrode 52 and the discharge gap, and therefore it cannot be obtained from the amounts of offset $H_1$ through $H_4$ in the four machining steps described above, because the discharge gap width is changeable depending on the discharge conditions. Similarly, in the case where a finished surface is obtained by machining the workpiece twice, the machined surface 79 can be regarded as the finished surface, and the amount of offset in the first machining step is the sum of the finishing margin $f_2$ in the second machining step, the wrre radius, and the discharge gap in the first machining step. In the second machining operation, the amount of offset is the sum of the wire radius and the discharge gap in the second machining step, and therefore it cannot be obtained directly from the data $H_1$ through $H_4$, because the finishing margins $f_2$ through $f_4$ and the discharge gaps in the machining operations cannot be determined.

As is apparent from the above description, in the case where the workpiece is finished by only one machining step or plural machining steps, the amounts of offset for all the machining steps must be stored in combination, although the same machining conditions are employed for the first through fourth machining steps. Furthermore, in machining a workpiece high in residual strain, sometimes a machining operation is carried out several times under the same machining conditions. In such a case, the conventional method of setting an amount of offset is not practical. If it is forcibly employed, then data necessary for determining an amount of offset will be considerably large in quantity.

SUMMARY OF THE INVENTION

Accordingly, an object of the present invention is to eliminate the above-described difficulties accompanying a conventional method of setting the amount of offset in a wire cut machining operation. More specifically, an object of the invention is to provide a method which is capable of reducing the number of data necessary for determining offset amounts, and of calculating offset data used in a plurality of machining operations, from a rough machining operation to a finish machining operation, which are carried out under the same machining conditions.

According to the present invention, the above, and other objects of the present invention are accomplished by a method of calculating an amount of offset for a wire electrode in an electric discharge machining operation in which the offset data including data representing a machining margin removed directly by the wire electrode and data representing a discharge gap is registered in advance with respect to each machining step, and those offset data thus registered are suitably combined to calculate the amounts of offset in the various machining operations.

Further, the objects of the present invention are accomplished by a method of calculating an amount of offset for a wire electrode in a wire cut electric discharge machining operation in which electric discharges are generated between said wire electrode and a workpiece to be machined to machine said workpiece to a desired configuration, comprising the steps of providing a plurality of data each representing the offset amount which is determined according to a machining condition defined by the material and the size of said wire electrode and the material and the size of said workpiece, the offset amount including a combination of a first machining margin to be removed by the wire electrode and a second machining margin to be removed by an electric discharge, determining the number of machining steps from rough machining to finish machining, and calculating the offset amount for each of the machining steps based on the plural data.

BRIEF DESCRIPTION OF THE DRAWINGS

In the accompanying drawings.

DESCRIPTION OF THE PREFERRED EMBODIMENTS

Figure 1:
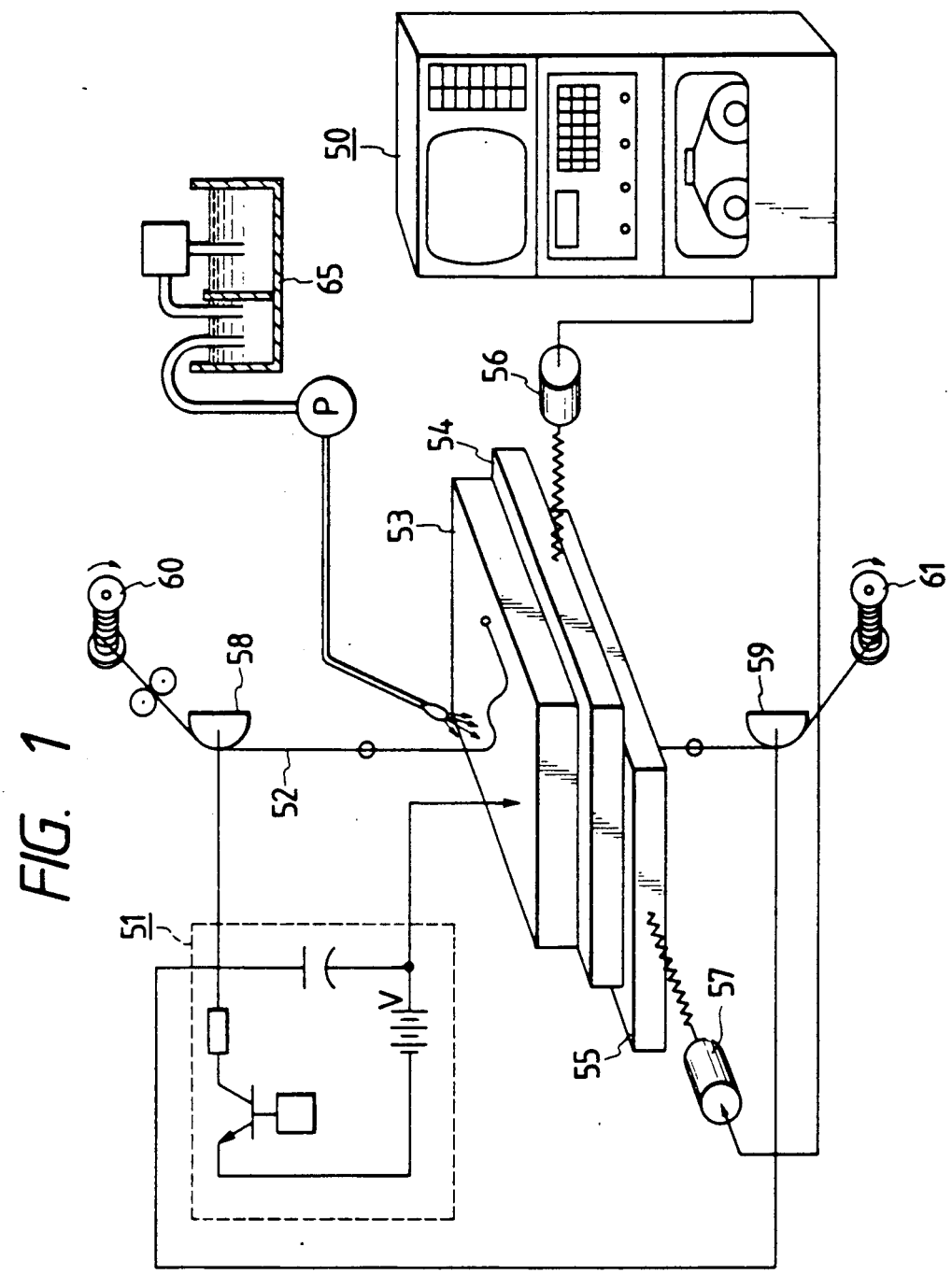
FIG. 1 is an explanatory diagram showing the entire arrangement of a wire cut electric discharge machine.
Figures 2, 3:
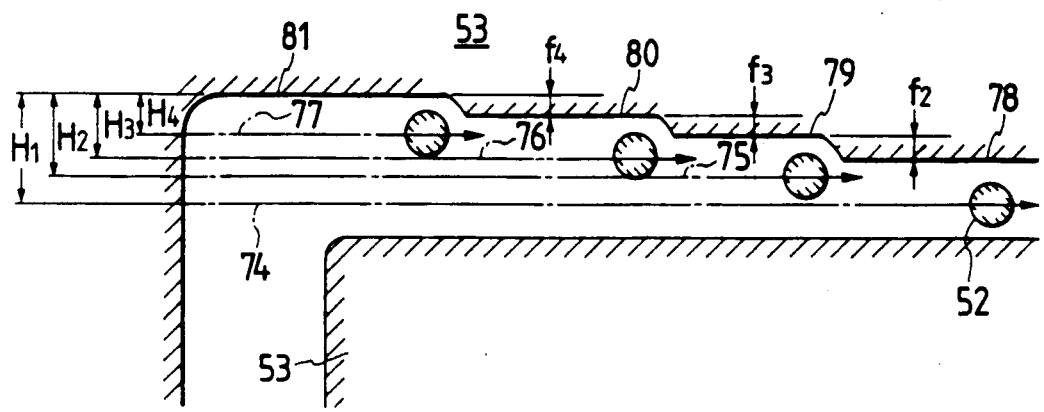
FIG. 2 is an explanatory diagram for a description of a conventional method of determining amounts of offset in machining operations.
FIG. 3 is a table indicating machining conditions for the machining operation performed in FIG. 2.
Figures 4, 5:
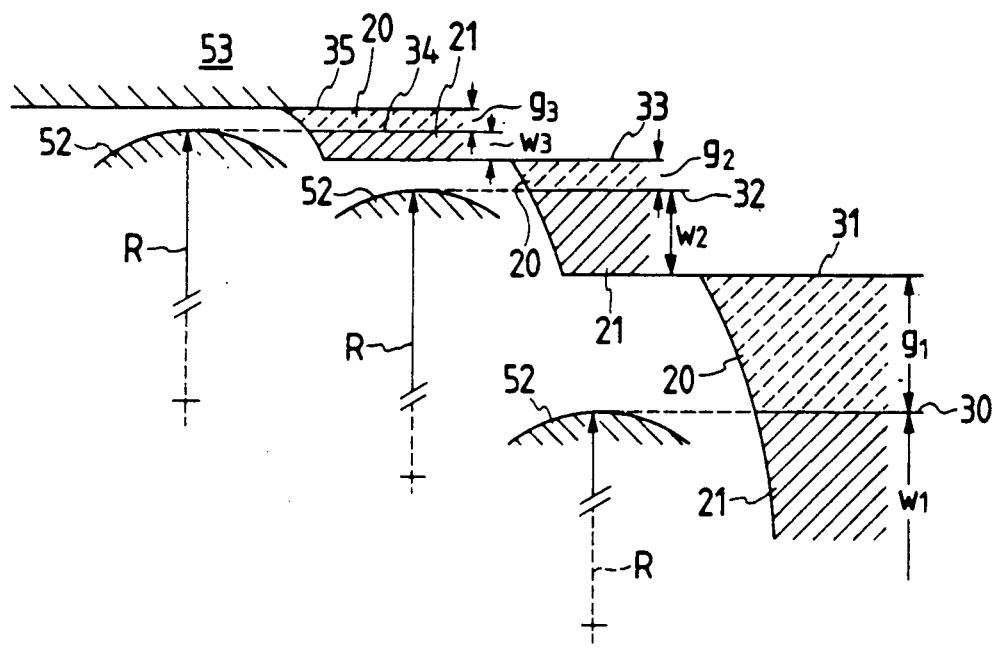
FIG. 4 is an explanatory diagram showing one embodiment of the present/invention in which a workpiece is machined three times.
FIG. 5 is a table indicating machining conditions for the machining operation shown in FIG. 4.

FIG. 4 shows an embodiment of the present invention, which is a sectional view of a workpiece in the case where it is finished by electric discharge machining it three times.

In FIG. 4, reference numeral or character 52 designates a wire electrode; $w_1$, the radius R of the wire electrode 52, or the machining margin which is removed by the wire electrode per se in the first machining step; $g_1$, the discharge gap width in the first machining step; and 31, the machined surface at the end of the first machining step. Further in FIG. 4, reference character $w_2$ designates the machining margin removed by the wire electrode 52 in the second machining step; $g_2$, the discharge gap width in the second machining step; and 33, the machined surface at the end of the second machining step. Similarly, reference character $w_3$ designates the machining margin removed by the wire electrode in the third machining step; $g_3$, the discharge gap width in the third machining step; and 35, the machined surface at the end of the third machining step. Further in FIG. 4, reference numeral 20 designates the discharge gaps (marked with oblique broken lines): and 21, the regions (marked with oblique solid lines) which are removed by the wire electrode.

FIG. 5 is a table indicating the machining conditions in the first through third machining steps; i.e., the machining margin removed by the wire electrode, and the discharge gap width.

Figure 6:
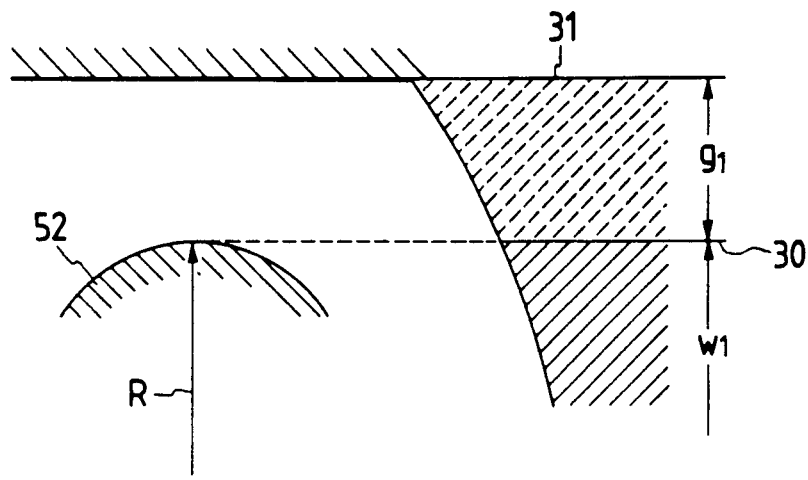
FIGS. 6, 7 and 8 are explanatory diagrams showing other machining operations.

FIG. 6 shows a machining operation which is carried out only once (hereinafter referred to as "a single machining operation", when applicable) under the machining condition listed in FIG. 5.

Figure 7:
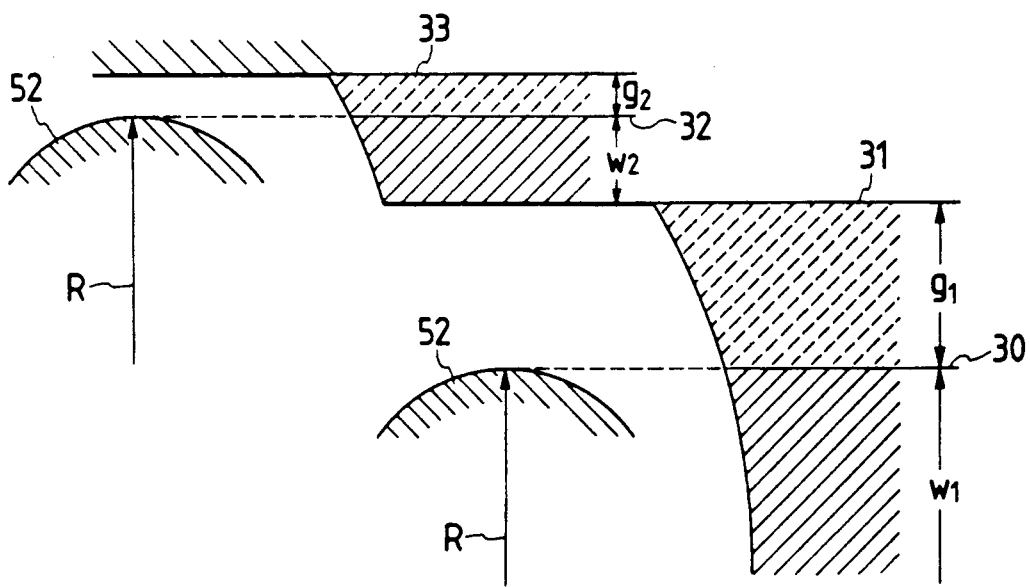

FIG. 7 shows the case where the workpiece is finished by machining it twice under the machining conditions shown in FIG. 5.

Figure 8:
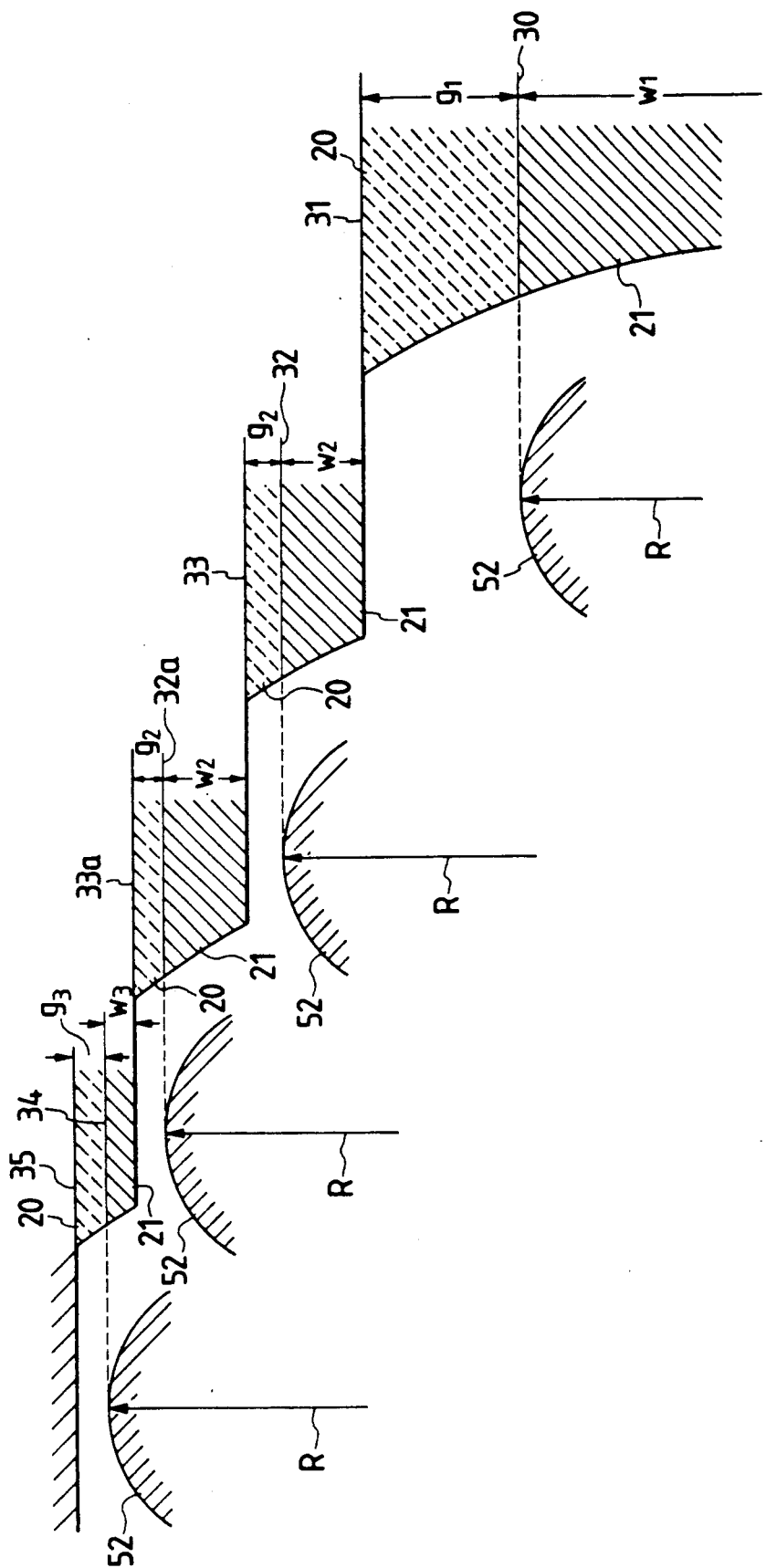

FIG. 8 show the case where the workpiece is machined four times; that is, the first machining operation is carried out under the machining condition A shown in FIG. 5, the second and third machining operations are carried out under the machining condition B shown in FIG. 5, and the fourth machining operation is performed under the machining condition C in FIG. 5.

The operation of the embodiment will be described with reference to FIGS. 4 through 8.

First, a method of calculating, in the case where the workpiece 53 is finished by machining the same three times under the machining conditions A, B and C shown in FIG. 5, the amounts of offset in the first through third machining steps will be described. As is apparent from FIG. 4, in the first machining operation, the amount of offset $H_1$ is the sum of the wire electrode radius R, the discharge gaps $g_1$, $g_2$ and $g_3$ in the first, second and third machining steps, and the machining margins $w_2$ and $w_3$ removed by the wire electrode 52 in the second and third machining steps. That is, $H_1 = w_i + g_1 + w_2 + g_2 + w_3 + g_3$. Similarly, in the second machining step, the amount of offset $H_2 = w_1 + g_2 + w_3 + g_3$. In the third machining step, the amount of offset $H_3$ is the sum of the wire electrode radius R and the discharge gap $g_3$ width in the third machining step. That is, $H_3 = w_1 + g_3$.

With the table shown in FIG. 5, the amounts of offset in a plurality of machining operations under the same machining condition can be calculated in the same manner. This will be described in more detail.

In the single machining operation as shown in FIG. 6, the machined surface 31 at the end of the first machining step in FIG. 4 is regarded as the final finished surface, to determine the amount of offset $H_1$; that is, it is determined as follows:

$$H_1 = w_1 + g_1$$

In the case where the workpiece is finished by machining the same twice, the final machined surface is the machine surface 33 at the end of the second machining step. Therefore, the amount of offset $H_1$ in the first machining operation is: $H_1 = (w_1 + g_1) + (w_2 + g_2)$, and the amount of offset $H_2$ in the second machining step is $H_2 = w_1 + g_2$.

In the case where the workpiece is finished by machining the same four times with the machining condition of the second machining operation used twice, the amounts of offset $H_1$, $H_2$, $H_3$ and $H_4$ in the first, second, third and fourth machining steps are given as follows:

$$H_1 = (w_1 + g_1) + (w_2 + g_2) \times 2 + (w_3 + g_3)$$
$$H_2 = w_1 + g_2 + w_2 + g_2 + w_3 + g_3$$
$$H_3 = w_1 + g_2 + w_3 + g_3$$
$$H_4 = w_1 + g_3$$

As is apparent from the above description, even in the case where the workpiece is machined plural times under the same machining condition (for instance it is machined twice under the machining condition of the second machining operation, and twice under the machining condition of the third machining operation), the amounts of offsets in all of the machining operations can be readily determined.

As was described above in detail, in the case where the workpiece is machined plural times under a variety of machining conditions, according to the invention, it is unnecessary to have the amounts of offset for the machining operations in combination for various conditions, and therefore the number of data required for determination of the amounts of offset can be reduced. In other words, the amounts of offsets under the same machining conditions are available for various machining operations. Furthermore, the method of the invention can deal with a variety of machining operations no matter how they are combined; that is, it can effectively determine the amounts of offset in machining a workpiece with ease.

I claim:

1. A method of calculating an amount of offset for a wire electrode in a wire cut electric discharge machining operation in which electric discharges are generated between said wire electrode and a workpiece to be machined to machine said workpiece to a desired configuration, comprising the steps of:

providing a data table including a plurality of data each relating to the offset amount for at least one machining condition defined by the material and the size of said wire electrode and the material and the size of said workpiece, said plural data including a combination of a first machining margin to be removed by said wire electrode and a second machining margin to be removed by an electric discharge;

determining the number of machining steps from rough machining to finish machining of the workpiece to be machined;

calculating the offset amount for each of the machining steps based on said plural data and machining a workpiece using said number of machining steps from rough machining to finish machining and said offset amount for each of the machining steps.

2. The method of claim 1 wherein the first machining margin corresponds to a radius of said wire electrode and the second machining margin corresponds to an interelectrode gap width.

3. The method of claim 1 wherein the plural data relate to the offset amounts under the same machining condition.

4. The method of claim 1 wherein plural sets of plural data for various machining conditions are provided, each set of which relates to the offset amounts under the same machining conditions.

* * * * *